United States Patent
Hodge, Jr.

(10) Patent No.: US 10,503,187 B1
(45) Date of Patent: Dec. 10, 2019

(54) APPARATUS FOR REGULATING A BIAS-VOLTAGE OF A SWITCHING POWER SUPPLY

(71) Applicant: Silanna Asia Pte Ltd, Singapore (SG)

(72) Inventor: Stuart Ide Hodge, Jr., Palm Coast, FL (US)

(73) Assignee: Silanna Asia Pte Ltd, Singapore (SG)

( * ) Notice: Subject to any disclaimer, the term of this patent is extended or adjusted under 35 U.S.C. 154(b) by 0 days.

(21) Appl. No.: 16/178,426

(22) Filed: Nov. 1, 2018

(51) Int. Cl.
| | |
|---|---|
| G05F 1/575 | (2006.01) |
| H02M 3/07 | (2006.01) |
| G05F 1/46 | (2006.01) |
| H02M 1/00 | (2006.01) |
| G05F 1/618 | (2006.01) |

(52) U.S. Cl.
CPC .............. *G05F 1/575* (2013.01); *G05F 1/461* (2013.01); *H02M 3/07* (2013.01); *G05F 1/618* (2013.01); *H02M 2001/0045* (2013.01)

(58) Field of Classification Search
CPC .......... G05F 1/465; G05F 1/461; G05F 1/618; G05F 1/595; G05F 1/59; G05F 1/575
See application file for complete search history.

(56) References Cited

U.S. PATENT DOCUMENTS

| | | | | |
|---|---|---|---|---|
| 6,175,266 B1* | 1/2001 | Sharpe-Geisler | ....... | G05F 1/575 327/359 |
| 8,773,105 B1* | 7/2014 | Kang | ...................... | H02H 9/04 323/313 |
| 2007/0070659 A1 | 3/2007 | Sawtell | | |
| 2007/0252564 A1* | 11/2007 | De Nisi | .................. | H02M 1/10 323/268 |
| 2008/0197908 A1 | 8/2008 | Williams | | |
| 2013/0234621 A1 | 9/2013 | Athalye | | |
| 2015/0198959 A1* | 7/2015 | Kuttner | ............... | H03F 3/45071 323/273 |
| 2017/0063223 A1 | 3/2017 | Raghupathy | | |

OTHER PUBLICATIONS

Bendel, Cascode Facilitates Simple Startup, United Silicocn Carbide, inc., Aug. 2016, 2 pages.

* cited by examiner

*Primary Examiner* — Harry R Behm
(74) *Attorney, Agent, or Firm* — MLO, a professional corp.

(57) ABSTRACT

An apparatus for regulating a bias-voltage of a switching power supply is disclosed. The apparatus includes a cascode amplifier, feedback-circuit, and bias-regulator circuit. The cascode amplifier includes a common-gate transistor and common-source transistor, where a source of the common-gate transistor is in signal communication with a drain of the common-source transistor. The feedback-circuit is in signal communication with the source of the common-gate transistor and the drain of the common-source transistor and the bias-regulator circuit is in signal communication with a gate of the common-source transistor, a gate of the common-gate transistor, and the feedback-circuit. The feedback-circuit receives a drain-voltage from the drain of the common-source transistor and produces a feedback-voltage and the bias-regulator circuit is configured to receive the feedback-voltage and produce and regulate the bias-voltage. A gate-voltage is produced from the bias-voltage and the gate-voltage is injected into the gate of the common-gate transistor.

20 Claims, 9 Drawing Sheets

APPARATUS FOR REGULATING A BIAS-VOLTAGE OF A SWITCHING POWER SUPPLY

BACKGROUND

At present, the existence and use of powered electronic devices has become commonplace. Modern power supplies are utilized to power or charge many of these powered electronic devices. In charging applications, the power output of these power supplies may be required to be adjustable. For example, USB-PD power supplies generally have power outputs that may be adjustable and vary from approximately 3 to 21 volts ("V"). Many of these types of power supplies are off-line switching power supplies.

Conventional off-line power supplies have operational requirements that rely on bias voltages for proper operation including start-up and steady state. Specifically, conventional off-line power supplies need one or more bias-voltages to power on and function properly. Furthermore, these off-line power supplies generally include a number of circuits, components, and devices within the off-line power supply that also need individual bias-voltages to operate properly. Complicating matters, some of these circuits, components, and devices operate in a fashion where the bias-voltage of one circuit, component, or device may directly affect the bias-voltage needs of another circuit, component, or device within the off-line power supply. Moreover, in the case of an off-line power supply that generates a bias-voltage using a voltage of a winding from a switching transformer, the voltage of the winding tracks the main output of the power supply. As an example, for power supplies with an adjustable output voltage from 3-21V (7:1 Change), if a 12V bias-voltage is needed, the voltage of the winding will have a range of 12V to 84V. Unfortunately, in this example, the excess voltage of the winding will need to be dropped across a circuit to generate the bias-voltage, such as for example, using a low-dropout ("LDO") regulator, and power will be lost (e.g., as heat). In general, the power loss will be equal to the voltage drop multiplied by the current across circuit. As such, there is a need for a system and method that creates bias-voltages for a switching power supply that has low loss.

SUMMARY

Disclosed is an apparatus for regulating a bias-voltage of a switching power supply. The apparatus includes a cascode amplifier, feedback-circuit, and bias-regulator circuit. The cascode amplifier includes a common-gate transistor and a common-source transistor, where a source of the common-gate transistor is in signal communication with a drain of the common-source transistor. The feedback-circuit is in signal communication with the source of the common-gate transistor and the drain of the common-source transistor and the bias-regulator circuit is in signal communication with a gate of the common-source transistor, a gate of the common-gate transistor, and the feedback-circuit. The feedback-circuit is configured to receive a drain-voltage from the drain of the common-source transistor and produce a feedback-voltage and the bias-regulator circuit is configured to receive the feedback-voltage and produce and regulate the bias-voltage. A gate-voltage is produced from the bias-voltage and the gate-voltage is injected into the gate of the common-gate transistor.

In an example of operation, the apparatus performs a method that includes receiving the drain-voltage from the drain of the common-source transistor of the cascode amplifier, producing the bias-voltage from the drain-voltage with the bias-regulator circuit, and injecting the gate-voltage at the gate of the common-gate transistor. The gate-voltage is related to the bias-voltage and producing the bias-voltage includes regulating the bias-voltage.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE DRAWINGS

The disclosure may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description, like reference numbers are used to identify like elements. Furthermore, the drawings are intended to illustrate major features of example embodiments in a diagrammatic manner. The drawings are not intended to depict every feature of actual embodiments nor relative dimensions of the depicted elements and are not drawn to scale.

An apparatus for regulating a bias-voltage of a switching power supply is disclosed. The apparatus includes a cascode amplifier, feedback-circuit, and bias-regulator circuit. The cascode amplifier includes a common-gate transistor and a common-source transistor, where a source of the common-gate transistor is in signal communication with a drain of the common-source transistor. The feedback-circuit is in signal communication with the source of the common-gate transistor and the drain of the common-source transistor and the bias-regulator circuit is in signal communication with a gate of the common-source transistor, a gate of the common-gate transistor, and the feedback-circuit. The feedback-circuit is configured to receive a drain-voltage from the drain of the common-source transistor and produce a feedback-voltage and the bias-regulator circuit is configured to receive the feedback-voltage and produce and regulate the bias-voltage. A gate-voltage is produced from the bias-voltage and the gate-voltage is injected into the gate of the common-gate transistor.

In an example of operation, the apparatus performs a method that includes receiving the drain-voltage from the drain of the common-source transistor of the cascode amplifier, producing the bias-voltage from the drain-voltage with the bias-regulator circuit, and injecting the gate-voltage at the gate of the common-gate transistor. The gate-voltage is related to the bias-voltage and producing the bias-voltage includes regulating the bias-voltage.

Figure 1:
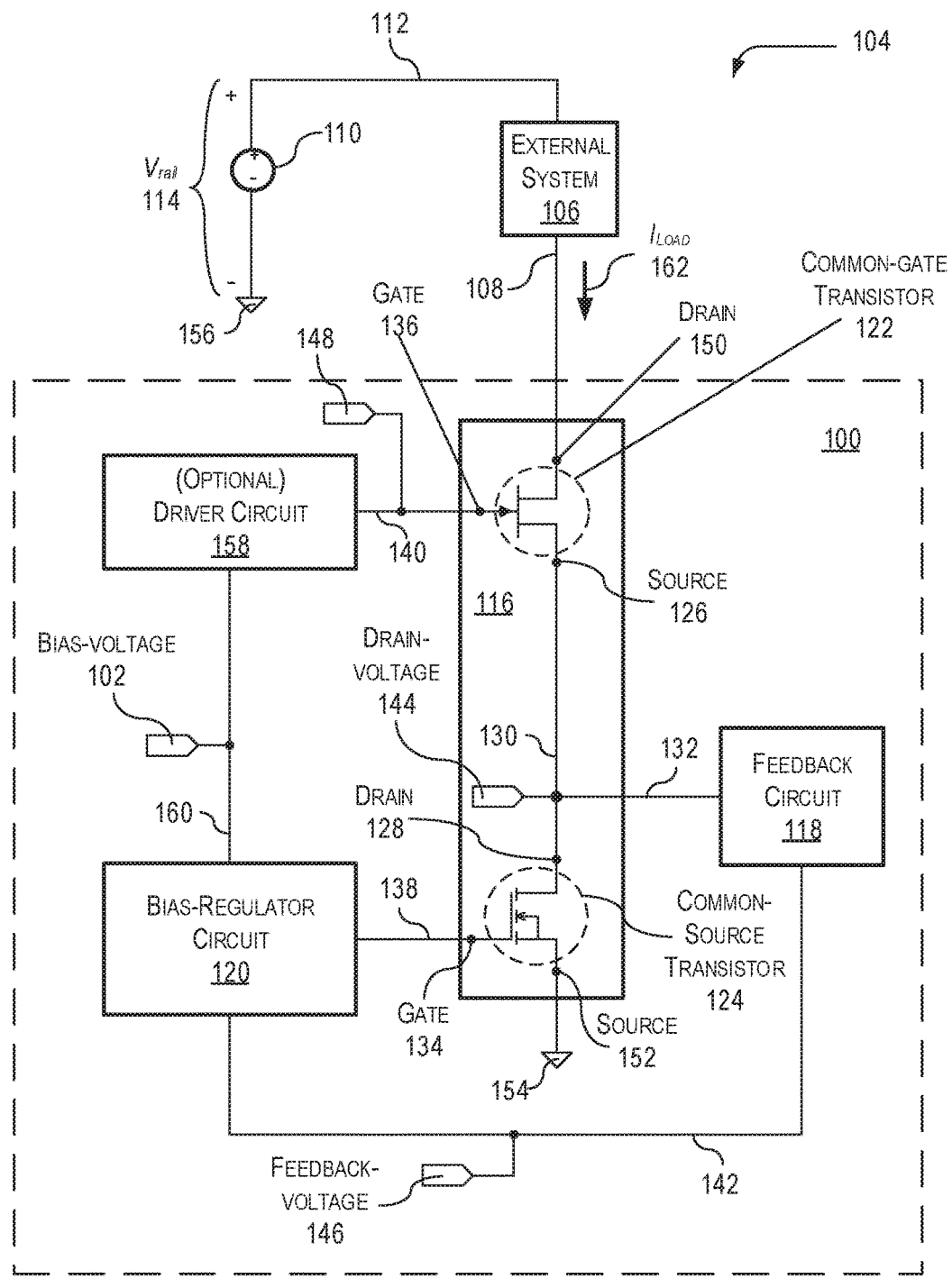
FIG. 1 is a system diagram of an example of an implementation of an apparatus for regulating a bias-voltage of a switching power supply in accordance with the present disclosure.

In FIG. 1, a system diagram of an example of an implementation of an apparatus 100 for regulating a bias-voltage 102 of a switching power supply 104 is shown in accordance with the present disclosure. The apparatus 100 is in signal communication with a external system 106 via signal path 108. In this example, the external system 106 may be another circuit, module, component, device, or system that is in signal communication with a reference direct current ("DC") voltage source 110, via signal path 112, that provides a rail-voltage 114 ("$V_{rail}$") to the external system 106.

The apparatus 100 includes a cascode amplifier 116, feedback-circuit 118, and bias-regulator circuit 120. The cascode amplifier 116 includes a common-gate transistor 112 and a common-source transistor 124, where a source 126 of the common-gate transistor 122 is in signal communication with a drain 128 of the common-source transistor 124 via signal path 130. The feedback-circuit 118 is in signal communication with the source 126 of the common-gate transistor 122 and the drain 128 of the common-source transistor 124 via signal path 132. The bias-regulator circuit 120 is in signal communication with a gate 134 if the common-source transistor 124, a gate 136 of the common-gate transistor 122, and the feedback-circuit 118 via signal paths 138, 140, and 142, respectively. The feedback-circuit 118 is configured to receive a drain-voltage 144 from the common-source transistor 124 and produce a feedback-voltage 146 that is passed to the bias- regulator circuit 120 via the signal path 142. The bias-regulator circuit 120 is configured to receive the feedback-voltage 146 and produce the bias-voltage 102. A gate-voltage 148 is producted the bias-voltage 102 and the gate-voltage 148 is injected into the gate 136 of the common-gate transistor 122.

The common-gate transistor 122 and common-source transistor 124 may be field-effect transistors ("FETs"). In this example, the common-gate transistor 122 may be an n-type junction field-effect transistor ("JFET") and the common-source transistor 124 may be an enhancement n-type metal-oxide-semiconductor field-effect transistor ("MOSFET").

In an example of operation, the apparatus 100 performs a method that includes receiving the drain-voltage 144 from the drain 128 of the common-source transistor 124 of the cascode amplifier 116, producing the bias-voltage 102 from the drain-voltage 144 with the bias-regulator circuit 120, and injecting the gate-voltage 148 at the gate 136 of the common-gate transistor 122. The gate-voltage 148 is related to the bias-voltage 102 and, in this example, producing the bias-voltage 102 includes regulating the bias-voltage 102.

It is appreciated by those skilled in the art that the circuits, components, modules, and/or devices of, or associated with, the apparatus 100 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

In this example, the external system 106 is in signal communication with a drain 150 of the common-gate transistor 122 via signal path 108 and a source 152 of the common-source transistor 124 is in signal communication with a ground 154 connection. For ease of illustration, the DC Voltage source 110 is also in signal communication with a ground 156 connection. As described earlier, the external system 106 may be another circuit, module, component, device, or system that is in signal communication with the reference DC voltage source 110 that provides the $V_{rail}$ 114 to the external system 106. The external system 106 may include, for example, a winding from a switching transformer and other circuitry such as a low-pass filter.

The cascode amplifier 116 (also known as a "cascode") is two-stage amplifier that includes a common-emitter or common-source stage feeding into a common-base or common-gate stage of the amplifier. In general, a cascode includes two transistors that may be bipolar junction transistors ("BJTs") or field-effect transistors ("FETs"). The cascode improves the input to output isolation and eliminates the Miller effect of the amplifier resulting in an amplifier having a high bandwidth. In this example, the first and second stages of the cascode amplifier 116 are shown as implemented with FETs. It is appreciated by those having ordinary skill in art that based on the design parameters of the apparatus 100 and external system 106, the two transistors (i.e., common-source transistor 124 and common-gate transistor 122) that may be implemented optionally as BJTs or FETs.

In this example, the external system 106 is part of a switching power supply with relatively high voltages so the two transistors (i.e., common-source transistor 124 and common-gate transistor 122) are shown as FETs. Specifically, the common-source transistor 124 is an enhancement n-type metal-oxide-semiconductor field-effect transistor ("MOSFET") and the common-gate transistor 122 is an n-type junction field-effect transistor ("JFET"). In this example, the JFET may be, for example, a Silicon Carbide JFET.

The feedback-circuit 118 is a circuit, component, module, or device that receives the drain-voltage 144 and produces the feedback-voltage 146 that is passed to the bias-regulator circuit 120 via signal path 142. In one example, the feedback-circuit 118 may be a feedback path that includes signal paths 132 and 142, where the feedback-voltage 146 is the drain-voltage 144 that is directly passed from the drain 128 of the common-source transistor 124 to the bias-regulator circuit 120 via the combined signal paths 132 and 142.

In an alternative example, the feedback-circuit 118 may be a circuit that is configured to receive the drain-voltage 144 and produce a supply voltage (generally known as a "voltage at the common collector", abbreviated as $V_{CC}$). The supply voltage $V_{CC}$ can be used as a supply voltage for circuits of the switching power supply 104 (e.g., by a controller circuit, not shown). In this example, the feedback-voltage 146 is the $V_{CC}$. In yet another alternative example, the feedback-circuit 118 may be, or include, a voltage-doubler circuit in signal communication with the source 126 of the common-gate transistor 122 and the drain 128 of the common-source transistor 124. In general, the voltage-doubler circuit is an electronic circuit that charges capacitors using an input voltage (i.e., the drain-voltage 144) and switches these charges in such a way that a produced output voltage (i.e., the feedback-voltage 146) of the voltage-doubler circuit is approximately twice the input voltage. In this example, the voltage-doubler circuit is configured to receive the drain-voltage 144 from the drain 128 of the common-source transistor 124 and produce the feedback-voltage 146, where the feedback-voltage 146 is equal to approximately twice the drain-voltage 144. In this example, the feedback-voltage 146 is another supply voltage generally known as a drain-supply voltage ("$V_{DD}$") that is approximately twice the drain-voltage 144 or $V_{CC}$ if the feedback-circuit 118 also includes circuitry configured to produce the first supply voltage $V_{CC}$ as described in the earlier example. In this example, the feedback-voltage 146 is the $V_{DD}$.

As an example of the feedback-circuit 118 including the voltage-doubler circuit, the voltage-doubler circuit may be a charge pump doubling circuit having a charge pump. In general, a charge pump is a type of DC-to-DC converter circuit that utilizes capacitors for energetic charge storage to raise or lower voltage. Charge pumps are circuits that are capable of high efficiencies while being electrically simple circuits.

The bias-regulator circuit 120 is a circuit, component, module, or device that receives the feedback-voltage 146 and produces the bias-voltage 102. The gate-voltage 148 is produced from the bias-voltage 102 and the gate-voltage 148 is injected into the gate 136 of the common-gate transistor 122. In this example, the bias-regulator circuit 120 includes a first reference voltage source and a difference amplifier that compares the feedback-voltage 146 against a first reference voltage of the first reference voltage-source to produce and regulate the bias-voltage 102. The difference amplifier may include an operational amplifier that is in signal communication with the feedback-circuit 118 and the first reference voltage-source.

Moreover, the bias-regulator circuit 120 may include a signal source (such as, a pulse width modulation "PWM" source) that sets the gate 134 of the common-source transistor 124 to a drive signal produced by the signal source. This signal source may be optionally a PWM source, predetermined signal source, or a signal source that is driven by the feedback-voltage 146 or another feedback signal (not shown).

In an example of operation, the bias-regulator circuit 120 produces the bias-voltage 102 from the feedback-voltage 146 by comparing the feedback-voltage 146 against a first reference voltage with the difference amplifier to produce and regulate the bias-voltage 102. The bias-regulator circuit 120 also sets the gate 134 of the common-source transistor 124 to the drive signal. By regulating the bias-voltage 102 that is related to the gate-voltage 148, which is injected into the gate 136 of the common-gate transistor 122, the bias-regulator circuit 120 also regulates the resulting drain-voltage 144 at the drain 128 of the common-source transistor 124. Furthermore, by regulating the drain-voltage 144, the bias-regulator circuit 120 also regulates the feedback-voltage 146, which may be either $V_{CC}$, $V_{DD}$, or both.

In this example, the apparatus 100 may also include an optional driver circuit 158 in signal communication with both the bias-regulator circuit 120 and the gate 136 of the common-gate transistor 122 via signal paths 160 and 140, respectively. The optional driver circuit 158 may include a voltage-divider circuit, where the voltage-divider circuit is configured to receive the bias-voltage 102 and produce the gate-voltage 148. The voltage-diver circuit may include a low-pass filter to filter out any high frequency noise on the bias-voltage 102 signal that is passed from the bias-regulator circuit 120 to the optional driver circuit 158. Alternatively, if no optional driver circuit 158 is present in the apparatus 100, the gate-voltage 148 is the bias-voltage 102 because the signal path 140 is the same as signal path 160 since there is no optional driver circuit 158 present.

Figure 2:
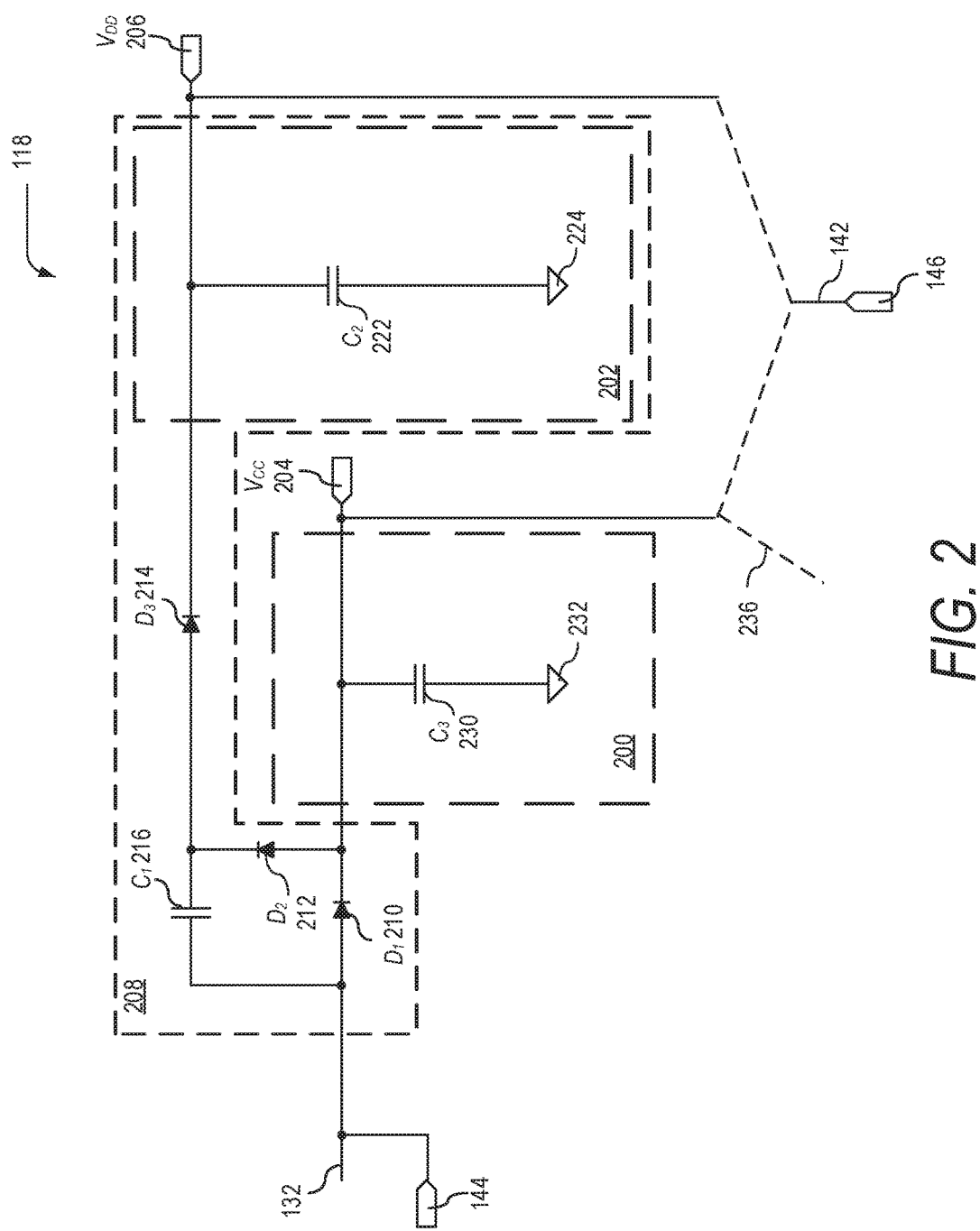
FIG. 2 is a circuit diagram of an example of an implementation of the feedback-circuit shown in FIG. 1 in accordance with the present disclosure.

In FIG. 2, a circuit diagram of an example of an implementation of the feedback-circuit 118 is shown in accordance with the present disclosure. In this example, the feedback-circuit 118 may include a first voltage-divider 200 and an optional second voltage-divider 202. As discussed earlier, the feedback-circuit 118 is a circuit, component, module, or device that receives the drain-voltage 144, via signal path 132, and produces the feedback-voltage 146 that is passed to the bias-regulator circuit 120 via signal path 142. In this example, the feedback-circuit 118 is a circuit that is configured to receive the drain-voltage 144 and produce the first supply voltage $V_{CC}$ 204 via the first voltage-divider 200. Moreover, the feedback-circuit 118 is also configured to receive the drain-voltage 144 and produce the second supply voltage $V_{DD}$ 206 via the optional second voltage-divider 202. Based on the design of the apparatus 100, either the first supply voltage $V_{CC}$ 204 or the second supply voltage $V_{DD}$ 206 may be utilized as the feedback-voltage 146 that is passed to the bias-regulator circuit 120.

In this example, the optional second voltage-divider 202 may be part of a voltage-doubler circuit 208. As an example, the voltage-doubler circuit 208 may include the optional second voltage-divider 202 and a first diode $D_1$ 210, second diode $D_2$ 212, third diode $D_3$ 214, and a first capacitor $C_1$ 216. The optional second voltage-divider 202 may include a second capacitor $C_2$ 222 and a ground 224 connection.

As described earlier, the voltage-doubler circuit 208 is an electronic circuit that charges $C_1$ 216 from the input voltage (i.e., the drain-voltage 144) and switches this charge in such a way that the produced output voltage (i.e., $V_{DD}$ 206) of the voltage-doubler circuit 208 is approximately twice the input voltage (i.e., the drain-voltage 144) or, instead, optionally approximately twice $V_{CC}$ 204. In this example, the voltage-doubler circuit 208 is a charge pump voltage-doubler circuit. As a further example, the first voltage-divider 200 may include a third capacitor $C_3$ 230 and another ground 232 connection.

As discussed earlier, the feedback-circuit 118 may instead only include a single voltage-divider (either the first voltage-divider 200 or the optional second voltage-divider 202) that produces either the first supply voltage $V_{CC}$ 204 or second supply voltage $V_{DD}$ 206 that is passed via feedback-voltage 146. Moreover, if the feedback-circuit 118 includes both the first voltage-divider 200 and the optional second voltage-divider 202, based on the design of the apparatus 100, the feedback-circuit 118 may be in signal communication with the bias-regulator circuit 120 via the signal path 142 and via a second signal path 236. In this example, the first signal path 142 may be utilized to pass the $V_{DD}$ 206 to the bias-regulator circuit 120 as the feedback-voltage 146 and the second signal path 236 may be utilized to pass the $V_{CC}$ 204 to the bias-regulator circuit 120, where the $V_{CC}$ 204 may be utilized by the differential amplifier and the $V_{DD}$ 206 may be utilized to bias circuits, components, modules, or devices within the bias-regulator circuit 120.

Figure 3:
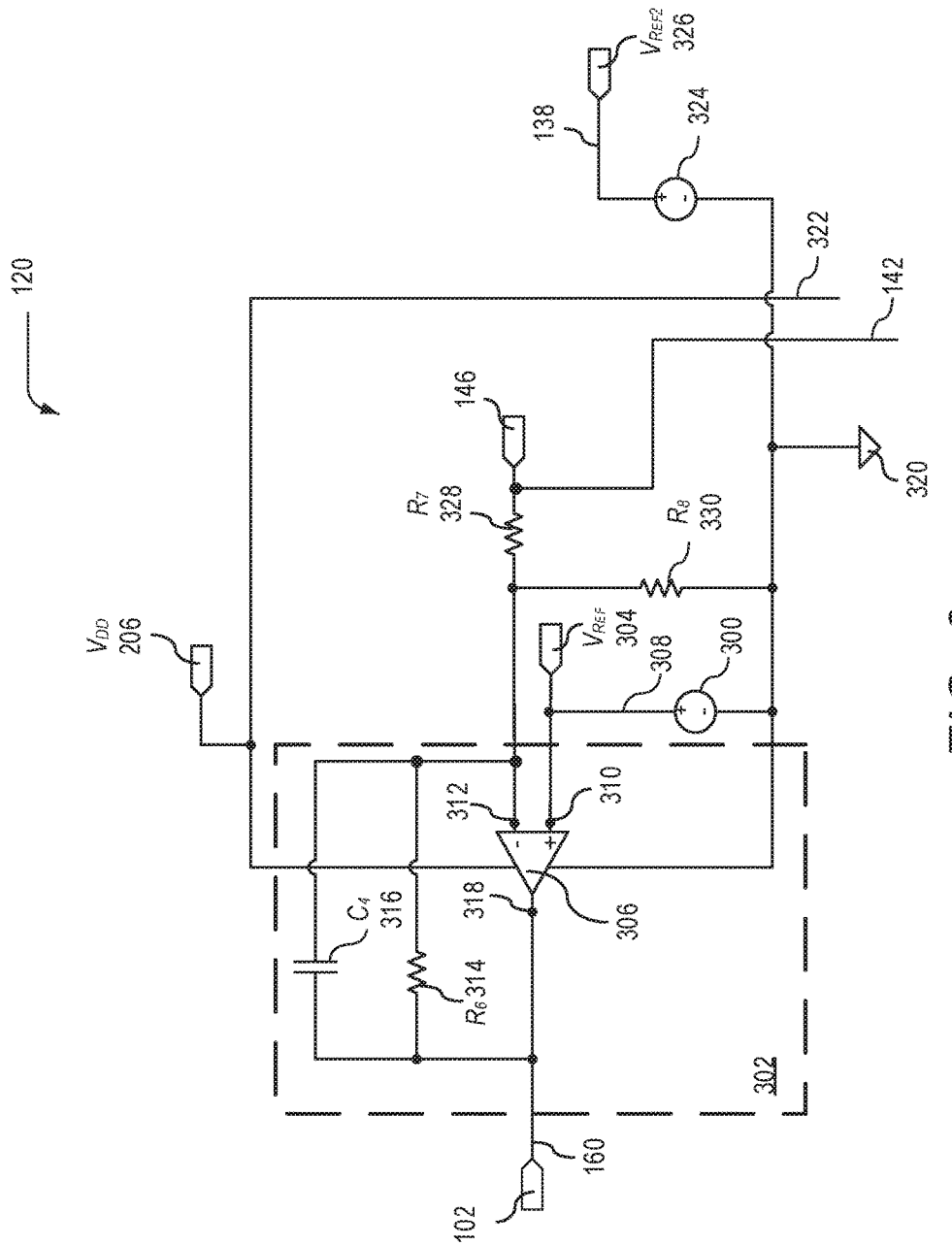
FIG. 3 is a circuit diagram of an example of an implementation of the bias-regulator circuit shown in FIG. 1 in accordance with the present disclosure.

Turning to FIG. 3, a circuit diagram of an example of an implementation of the bias-regulator circuit 120 is shown in accordance with the present disclosure. As discussed earlier, the bias-regulator circuit 120 is a circuit, component, module, or device that receives the feedback-voltage 146 via signal path 142 and produces the bias-voltage 102. In this example, the bias-regulator circuit 120 includes a first reference voltage source 300 and a difference amplifier 302 that compares the feedback-voltage 146 (or $V_{CC}$ 204 if the second signal path 236 is present) against a first reference voltage ("$V_{Ref}$") 304 of the first reference voltage-source 300 to produce and regulate the bias-voltage 102. In this example, based on the previous description in relation to FIG. 2, it is appreciated by those of ordinary skill in the art, that based on the design, if the second signal path 236 is present, signal path 142 may instead be the second signal path 236 and the feedback-voltage 146 would instead be voltage of $V_{CC}$ 204 provided by the second signal path 236. The difference amplifier 302 may include an operational amplifier ("op-amp") 306 that is in signal communication with the feedback-circuit 118 and the first reference voltage-source via signal paths 142 and 308, respectively. In this example, the $V_{Ref}$ 304 is applied to the positive input terminal 310 of the op-amp 306 and the feedback-voltage 146 is applied to the negative input terminal 312 of the op-amp 306. The difference amplifier 302 also includes a first resistor $R_1$ 314 and fourth capacitor $C_4$ 316, where both the $R_1$ 314 and $C_4$ 316 are arranged in parallel and in signal communication with the negative input terminal 312 of the op-amp 306 and an output terminal 318 of the op-amp 306. The op-amp 306 is also in signal communication with a ground 320 connection and is biased by $V_{DD}$ 206 that is passed to the op-amp 306 via signal path 322. Based on the design, the signal path 322 may be the same signal path 142 if the $V_{DD}$ 206 is equal to the feedback-voltage 146. Alternatively, if the $V_{DD}$ 206 is not equal to the feedback-voltage 146 because the feedback-voltage is instead equal to $V_{CC}$ 204, the signal path 322 may be the second signal path 236 shown in FIG. 2. In this alternative example, the $V_{CC}$ 204 is compared against $V_{Ref}$ 304 and $V_{DD}$ 206 is utilized to bias the op-amp 306.

In this example, the bias-regulator circuit 120 may include the signal source 324 that sets the gate 134 of the common-source transistor 124 to a drive signal ("$V_{Ref2}$") 326 produced by the signal source 324. As discussed earlier, the signal source 324 may be optionally a PWM source, pre-determined signal source, or a signal source that is driven by the feedback-voltage 146 or another feedback signal (not shown). The bias-regulator circuit 120 may include a second resistor $R_2$ 328 and third resistor $R_3$ 330 arranged as a voltage-divider circuit in signal communication with the negative input terminal 312 of the op-amp 306, ground 320 connection, and the feedback-circuit 118 via signal path 142. In this example, the feedback-voltage 146 would voltage drop across $R_2$ 328 prior to being applied to the negative input terminal 312 of the op-amp 306.

As discussed earlier, in an example of operation, the bias-regulator circuit 120 produces the bias-voltage 102 from the feedback-voltage 146 by comparing the feedback-voltage 146 against the $V_{Ref}$ 304 with the difference amplifier 302 to produce and regulate the bias-voltage 102. The bias-regulator circuit 120 also sets the gate 134 of the common-source transistor 124 to the $V_{Ref2}$ 326. Also as discussed earlier, by regulating the bias-voltage 102 that is related to the gate-voltage 148, which is injected into the gate 136 of the common-gate transistor 122, the bias-regulator circuit 120 also regulates the resulting drain-voltage 144 at the drain 128 of the common-source transistor 124. Furthermore, by regulating the drain-voltage 144, the bias-regulator circuit 120 also regulates the feedback-voltage 146, which may be either $V_{CC}$, $V_{DD}$, or both. Moreover, by regulating the gate-voltage 148, the bias-regulator circuit 120 also regulates the amount of current ("$I_{External\ system}$") 162 flowing from the external system 106 through the apparatus 100 to the feedback-circuit 118, ground 154 at the source 152 of the common-source transistor 124, or both.

Figure 4:
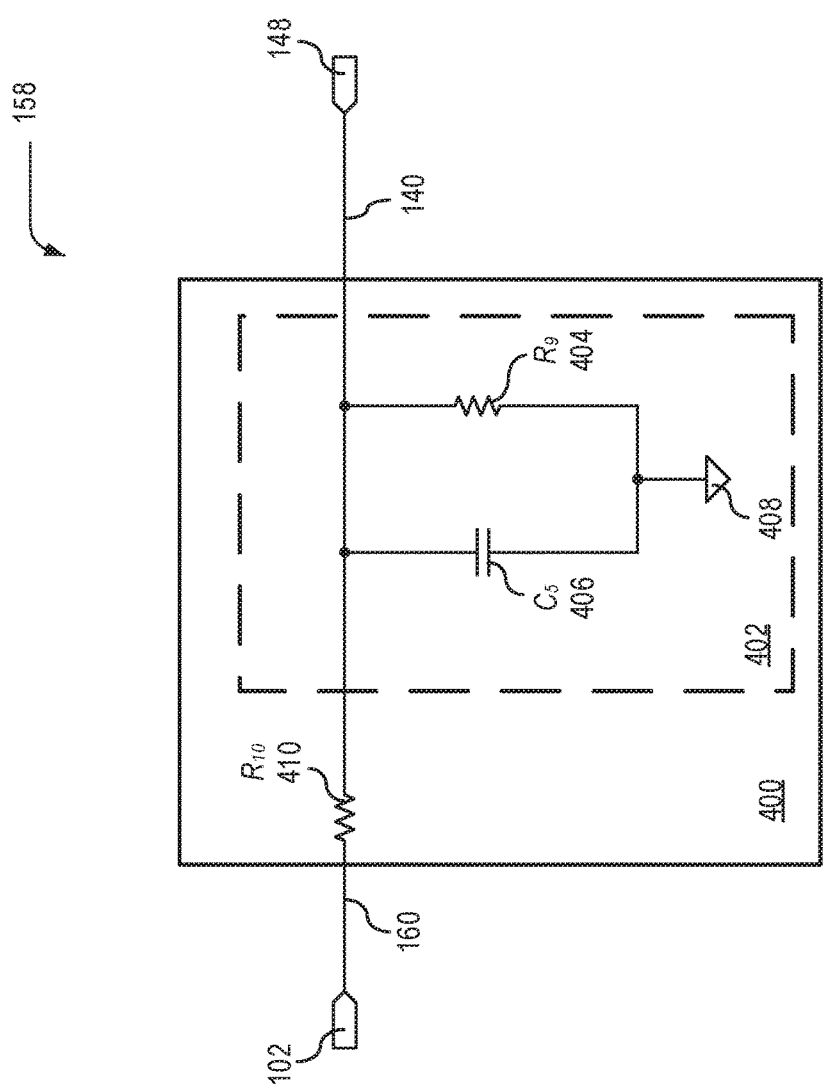
FIG. 4 is a circuit diagram of an example of an implementation of the optional driver circuit shown in FIG. 1 in accordance with the present disclosure.

In FIG. 4, a circuit diagram of an example of an implementation of the optional driver circuit 158 is shown in accordance with the present disclosure. The optional driver circuit 158 is in signal communication with both the bias-regulator circuit 120 and the gate 136 of the common-gate transistor 122 via signal paths 160 and 140, respectively. The optional driver circuit 158 may include a voltage-divider circuit 400, where the voltage-divider circuit 400 is configured to receive the bias-voltage 102 and produce the gate-voltage 148. The voltage-divider circuit 400 may include a low-pass filter 402 to filter out any high frequency noise on the bias-voltage 102 signal that is passed from the bias-regulator circuit 120 to the optional driver circuit 158. In this example, the low-pass filter 402 may include a fourth resistor $R_4$ 404 and fifth capacitor $C_5$ 406 that are arranged in parallel and in signal communication with both a ground connection 408 and a fifth resistor $R_5$ 410, and the gate 136 of the common-gate transistor 122 via signal path 140. $R_5$ 410 is also in signal communication with gate 136 of the common-gate transistor 122 and bias-regulator circuit 120 via signal paths 140 and 160, respectively. In general, the combination of the voltage-divider circuit 400 and low-pass filter 402 reduce the magnitude of the voltage value of the bias-voltage 102 to produce the gate-voltage 148 and filter out any high-frequency noise from the gate-voltage 148 prior to injecting the gate-voltage 148 into the gate 136 of the common-gate transistor 122. As discussed earlier, alternatively, if no optional driver circuit 158 is present in the apparatus 100, the gate-voltage 148 is the bias-voltage 102 because the signal path 140 is the same as signal path 160 since there is no optional driver circuit 158 present.

Figure 5:
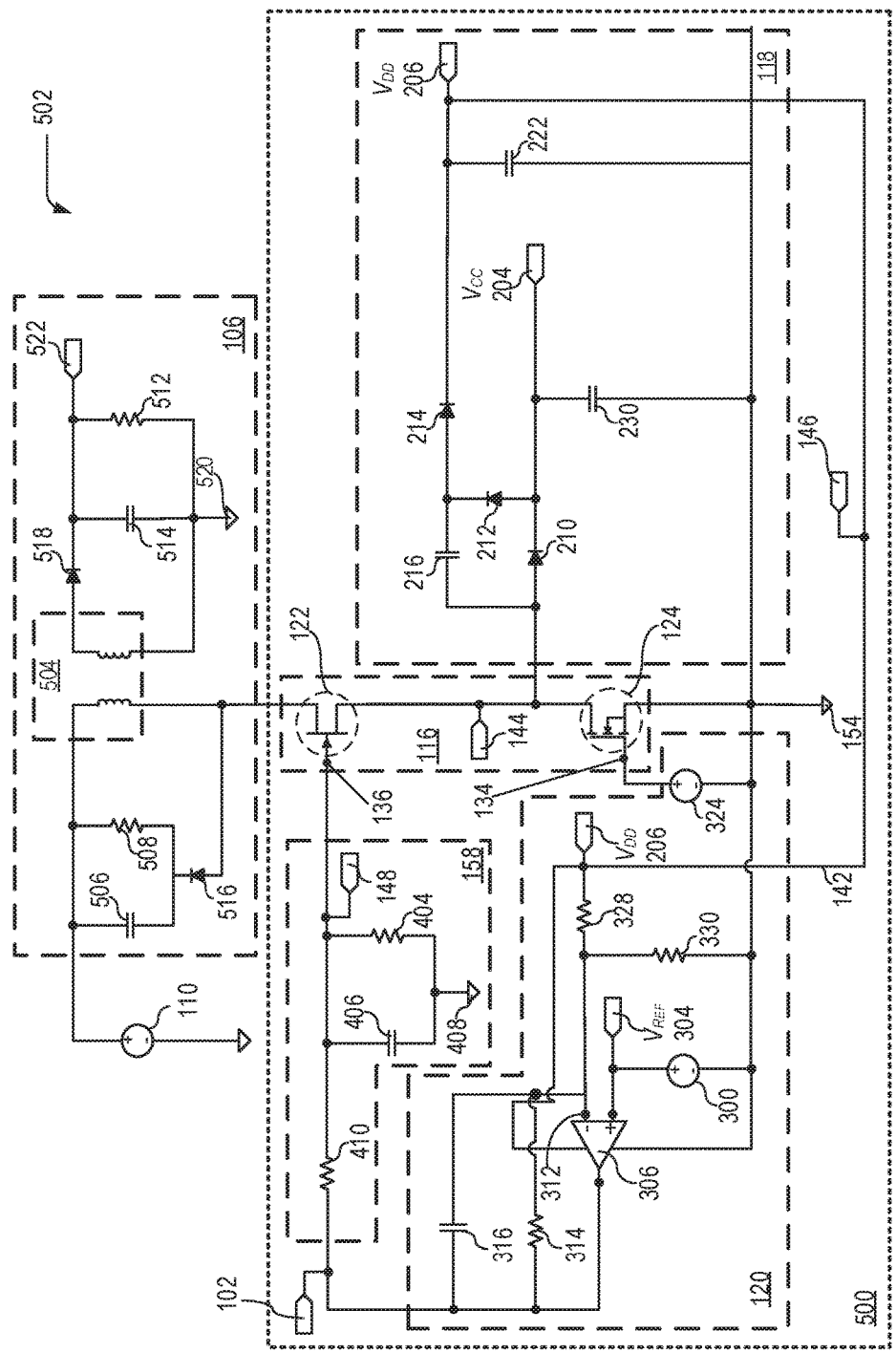
FIG. 5 is a circuit diagram of an example of an implementation of the apparatus for regulating the bias-voltage of a switching power supply shown in FIG. 1 in accordance with the present disclosure.

Turning to FIG. 5, a circuit diagram of an example of an implementation of the apparatus 500 for regulating the bias-voltage of a switching power supply 502 is shown in accordance with the present disclosure. In this example, similar to the example shown in FIG. 1, the apparatus 500 includes the cascode amplifier 116, feedback-circuit 118, bias-regulator circuit 120, and optional driver circuit 158. Additionally, the switching power supply 502 includes the external system 106. In this example, the circuit elements shown and described earlier in relation to FIGS. 1 through 4 for the cascode amplifier 116, feedback-circuit 118, bias-regulator circuit 120, and optional driver circuit 158 are again shown in this example.

Specific to this example, the $V_{DD}$ 206 is shown to be the feedback-voltage 146 that is passed to the bias-regulator circuit 120 via signal path 142. This $V_{DD}$ 206 is shown to both bias the op-amp 306 and be injected into the negative input terminal 312 of the op-amp 306 through the $R_2$ 328. The external system 106 is shown to have a transformer 504, sixth capacitor $C_6$ 506, sixth resistor $R_6$ 508, seventh resistor $R_7$ 512, seventh capacitor $C_7$ 514, fourth diode $D_4$ 516, and fifth diode $D_5$ 518. In this example, the $C_7$ 514 and $R_7$ 512 are in signal communication with a ground 520 connection and with an output 522 of the external system 106.

Figure 6:
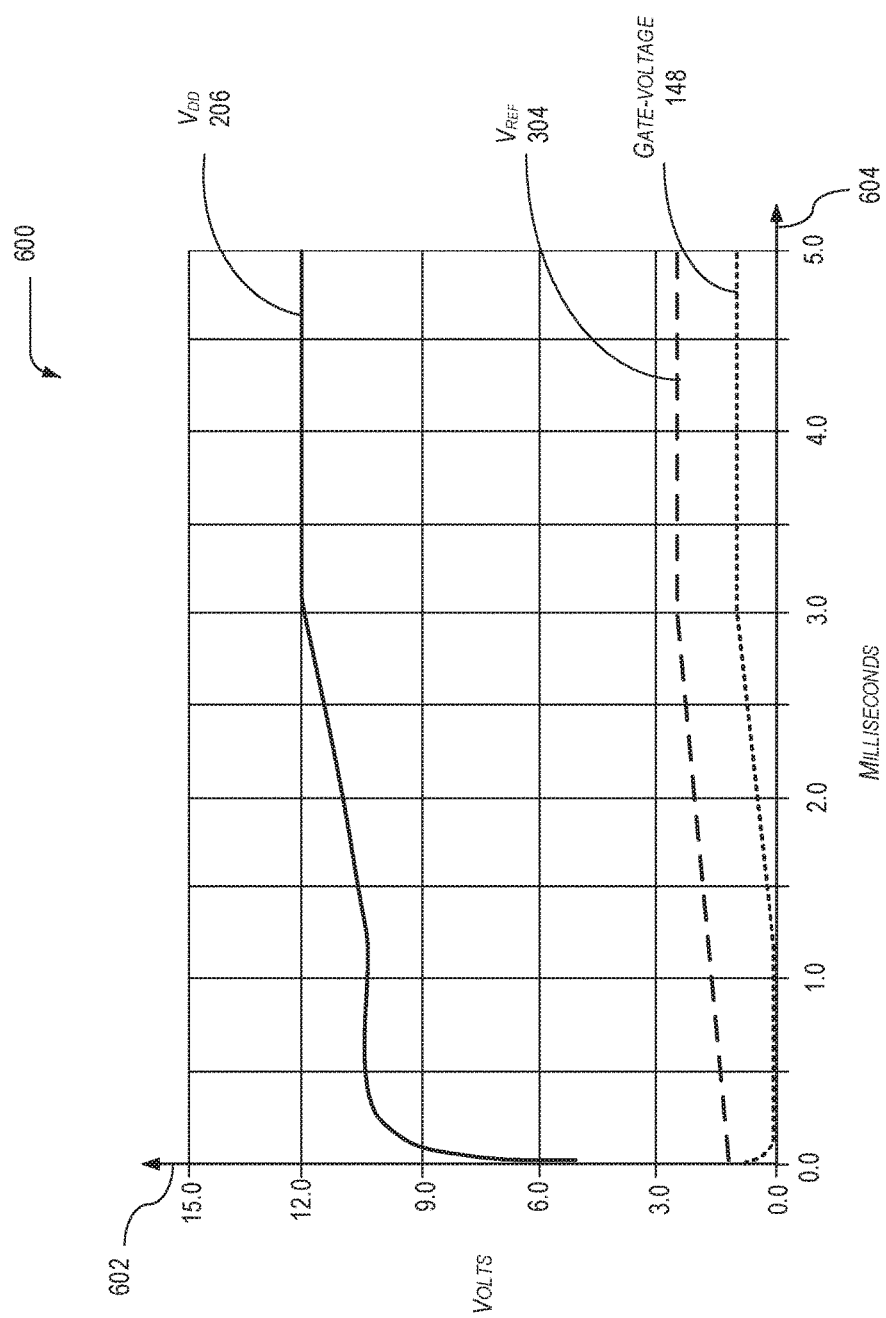
FIG. 6 is a graph of a plot of an example of values of voltages of drain-supply voltage ("$V_{DD}$"), gate-voltage, and first reference voltage ("$V_{Ref}$"), shown in FIGS. 1-3 and 5, as a function of time in accordance with the present disclosure.

In this example, $C_2$ 222 and $C_3$ 230 are sized to achieve low ripple voltage based on the loading of the IC and the switching frequency also known as the off time of the cascode, where $C=(T_{off}*I_{Bias})/\Delta V_{Ripple}$. As an example of operation, in FIG. 6, a graph 600 of three plots are shown of examples of the voltages $V_{DD}$ 206, gate-voltage 148, and $V_{Ref}$ 304 as a function of time in accordance with the present disclosure. In this example, the graph 600 has a vertical axis 602 representing voltage and a horizontal axis 604 representing time. The vertical axis 602 has a range from 0 to 15 Volts and the horizontal axis 804 has a range of 0 to 5 milliseconds.

Figure 7:
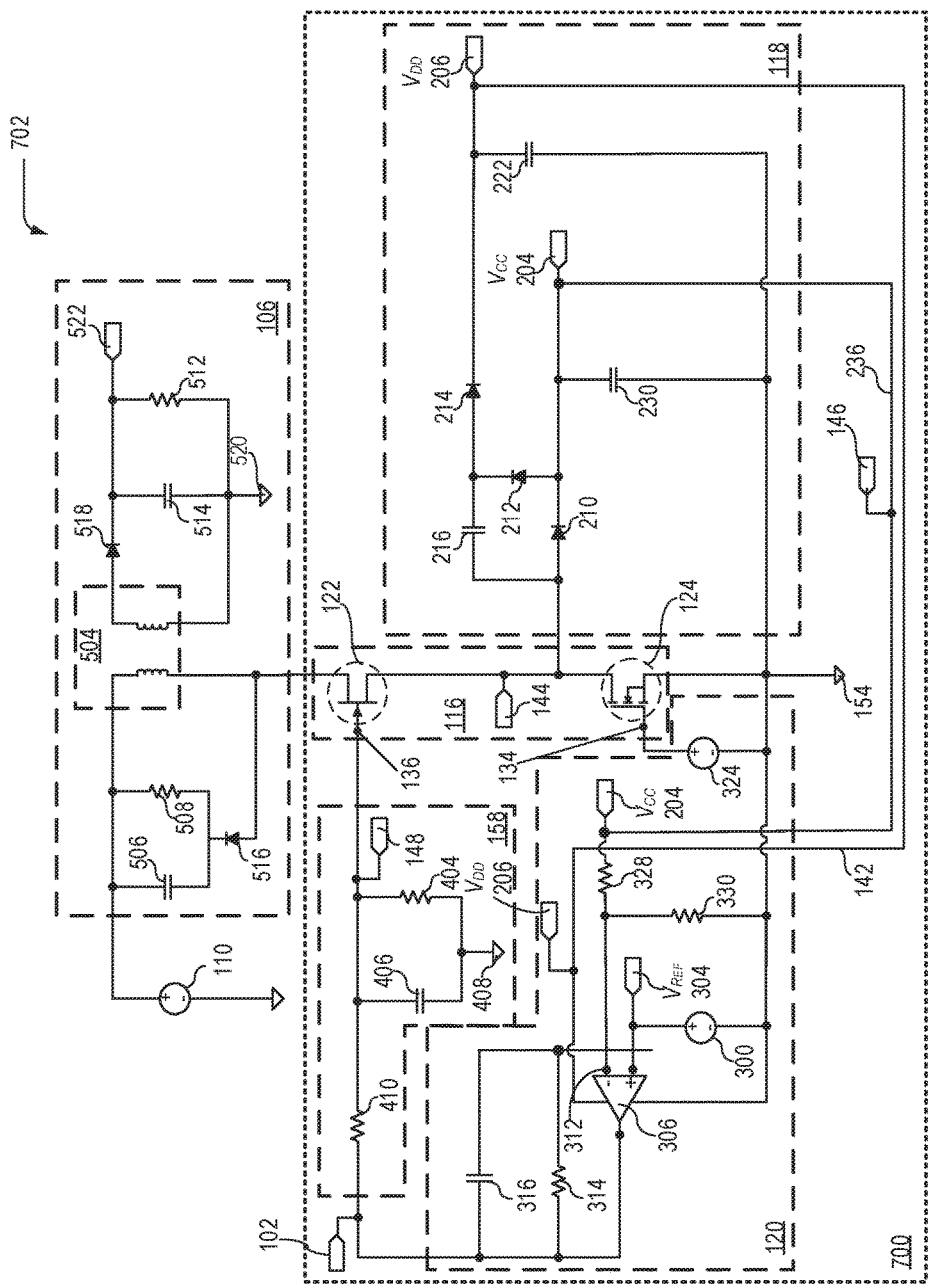
FIG. 7 is a circuit diagram of an example of another implementation of the apparatus for regulating the bias-voltage of a switching power supply shown in FIG. 1 in accordance with the present disclosure.
Figure 8:
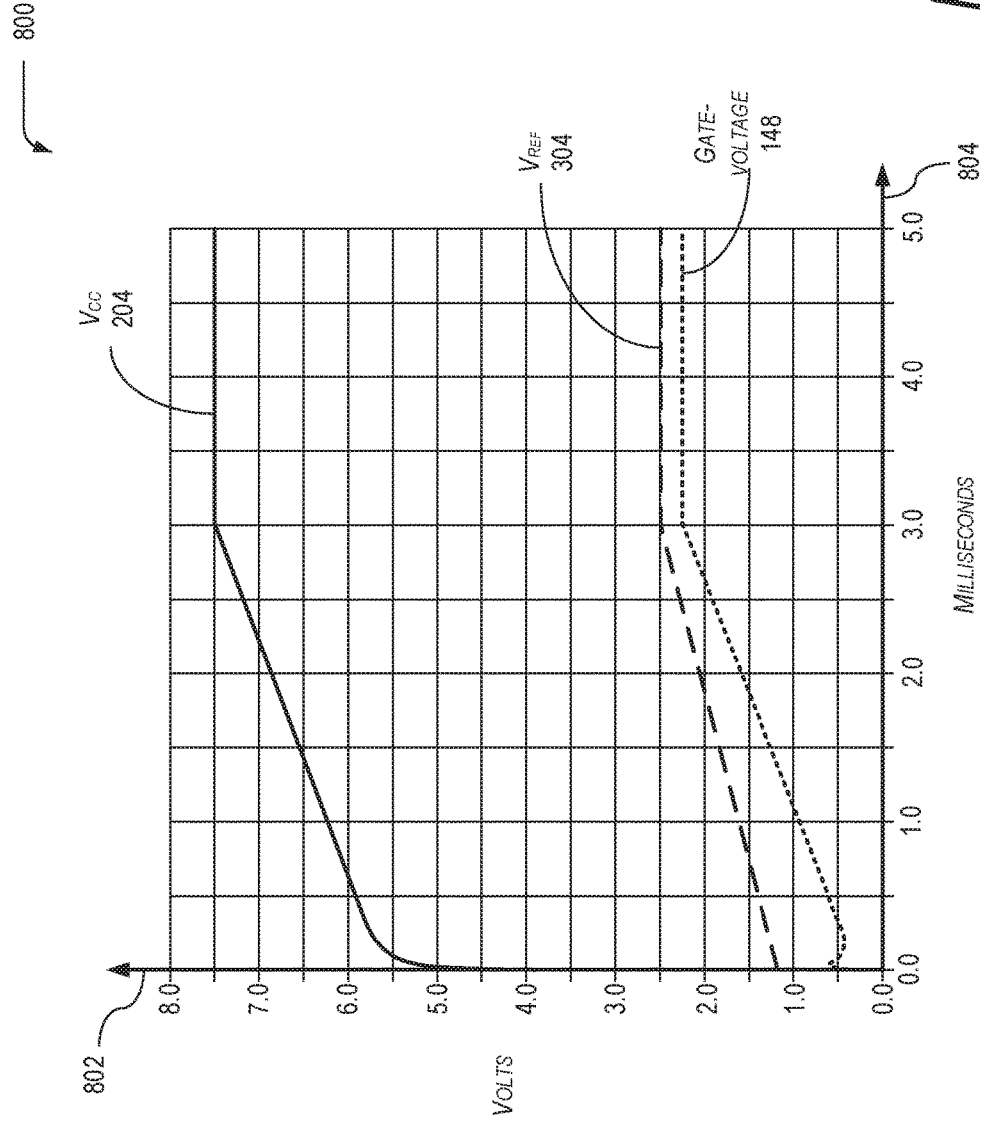
FIG. 8 is a graph of three plots of example values of voltages of a supply voltage (generally known as a "voltage at the common collector", abbreviated as $V_{CC}$), gate-voltage, and $V_{Ref}$ shown in FIGS. 1-3 and 7, as a function of time in accordance with the present disclosure.

In FIG. 7, a circuit diagram of an example of another implementation of the apparatus 700 for regulating the bias-voltage of a switching power supply 702 is shown in accordance with the present disclosure. In this example, the apparatus 700 is similar to the apparatus 500 shown and described in relation to FIG. 5. The difference is that in FIG. 7, unlike the apparatus 500 shown in FIG. 5, the apparatus 700 has two feedback signal paths 142 and 236 from the feedback-circuit 118 to the bias-regulator circuit 120. The first feedback signal path 142 passes the $V_{DD}$ 206 to the bias-regulator circuit 120 while the second feedback signal path 236 passes the $V_{CC}$ 204 to the bias-regulator circuit 120. In this example, the $V_{DD}$ 206 is utilized by the op-amp 306 to bias the op-amp 305, while the $V_{CC}$ 204 is applied the op-amp 306 via the $R_2$ 328 and compared to the $V_{Ref}$ 304. As an example of operation, in FIG. 8, a graph 800 of three plots are shown of examples of the voltages $V_{CC}$ 204, gate-voltage 148, and $V_{Ref}$ 304 as a function of time in accordance with the present disclosure. In this example, the graph 800 has a vertical axis 802 representing voltage and a horizontal axis 804 representing time. The vertical axis 802 has a range from 0 to 8 Volts and the horizontal axis 804 has a range of 0 to 5 milliseconds.

Figure 9:
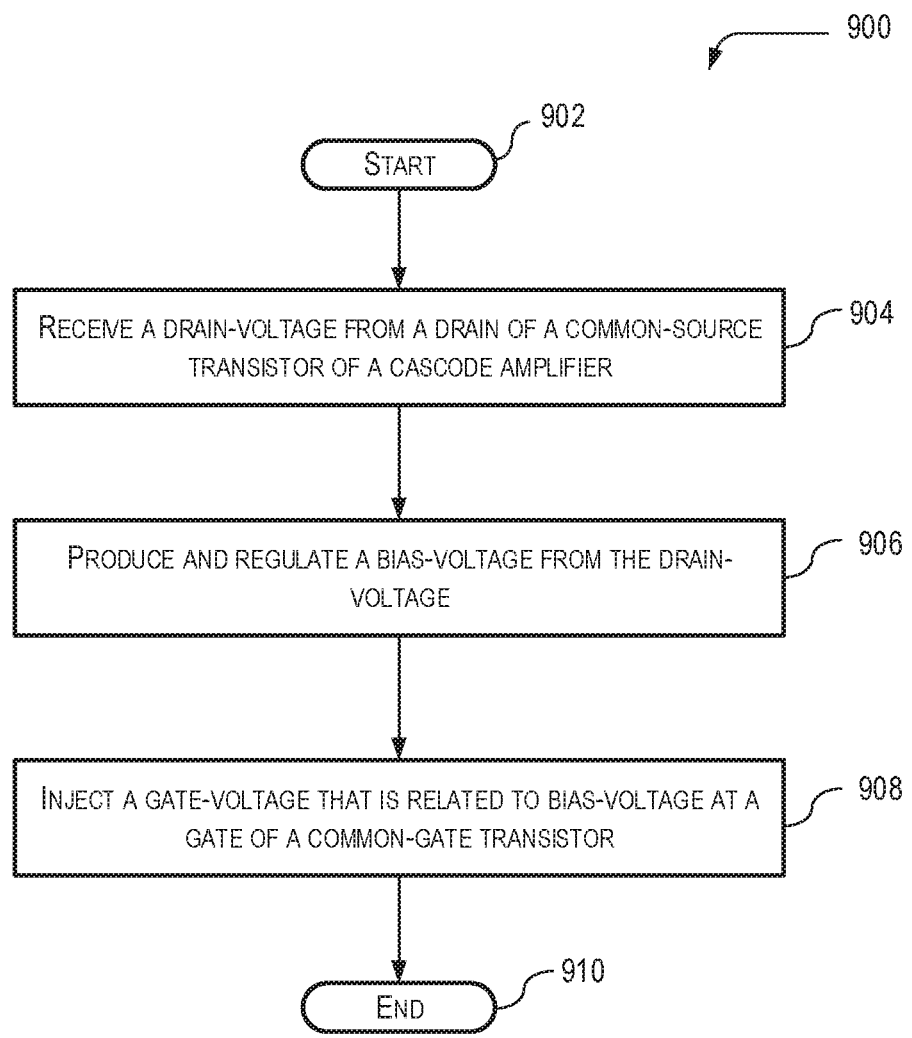
FIG. 9 is a flowchart of an example implementation of a method for regulating a bias-voltage of a switching power supply in accordance with the present disclosure.

Turning to FIG. 9, a flowchart of an example implementation of a method 900 for regulating a bias-voltage of a switching power supply is shown in accordance with the present disclosure. In this example, the method utilizes any of the apparatuses 100, 500, and 700 shown and described earlier in relation to in FIGS. 1, 5, and 7, respectively.

The method starts 902 by receiving 904 the drain-voltage 144 from a drain 128 of the common-source transistor 124 of the cascode amplifier and producing 906 the bias-voltage 102 from the drain-voltage 144 with the bias-regulator circuit 120. The method then includes injecting 908, the gate-voltage 148 at the gate 136 of the common-gate transistor 122. The method then ends 910. Again, in this example, the gate-voltage 148 is related to the bias-voltage 102, and producing the bias-voltage 102 includes regulating the bias-voltage 102.

In this example, receiving the drain-voltage 144 from the drain 128 of the common-source transistor 124 may include receiving the drain-voltage 144 with the feedback-circuit 118 and, in response, producing a feedback-voltage 146, and producing the bias-voltage 102 from the drain-voltage 144 may include producing the bias-voltage 102 from the feedback-voltage 146 with the bias-regulator circuit 120. Furthermore, producing the bias-voltage 102 from the feedback-voltage 146 may include comparing the feedback-voltage 146 against the $V_{Ref}$ 304 with the difference amplifier 302 to produce and regulate the bias-voltage 102. In this example, the method 900 may further include setting the gate 134 of the common-source transistor 124 to the $V_{Ref2}$ 326.

In an alternative example of the method 900, the feedback-voltage 146 may be produced by the voltage-doubler circuit 208 within the feedback-circuit 118 and the feedback-voltage 146 may be equal to approximately twice the drain-voltage 144. In this alternative example, producing the bias-voltage 102 from the feedback-voltage 146 includes comparing the feedback-voltage 146 against the $V_{Ref}$ 304 with the difference amplifier 302 to produce and regulate the bias-voltage 102, and further including setting the gate 134 of the common-source transistor 124 to the $V_{Ref2}$ 326.

In this example, injecting the gate-voltage 148 at the gate 136 of the common-gate transistor 122 may include voltage dividing the bias-voltage 102 to produce the gate-voltage 148 with the voltage-divider circuit 400. In this example, the method 900 further includes low-pass filtering the bias-voltage 102 to produce the gate-voltage 148 with the voltage-divider circuit 400.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different examples of implementations has been presented for purposes of illustration and description, and is not intended to be exhaustive or limited to the examples in the form disclosed. Many modifications and variations will be apparent to those of ordinary skill in the art. Further, different examples of implementations may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

Moreover, reference has been made in detail to examples of implementations of the disclosed invention, one or more examples of which have been illustrated in the accompanying figures. Each example has been provided by way of explanation of the present technology, not as a limitation of the present technology. In fact, while the specification has been described in detail with respect to specific examples of implementations of the invention, it will be appreciated that those skilled in the art, upon attaining an understanding of the foregoing, may readily conceive of alterations to, variations of, and equivalents to these examples of implementations. For instance, features illustrated or described as part of one example of an implementation may be used with example of another implementation to yield a still further example of an implementation. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. An apparatus for regulating a bias-voltage of a switching power supply, the apparatus comprising:
   a cascode amplifier having a common-gate transistor and a common-source transistor, wherein a source of the common-gate transistor is in signal communication with a drain of the common-source transistor;
   a feedback-circuit in signal communication with the source of the common-gate transistor and the drain of the common-source transistor, wherein the feedback-circuit is configured to receive a drain-voltage from the drain of the common-source transistor and produce a first feedback-voltage and a second feedback-voltage using the drain-voltage, the first feedback-voltage having a first voltage level and the second feedback-voltage having a second voltage level; and
   a bias-regulator circuit in signal communication with a gate of the common-source transistor, a gate of the common-gate transistor, and the feedback-circuit,
   wherein the bias-regulator circuit is configured to receive the first feedback-voltage and the second feedback-voltage and produce and regulate the bias-voltage using the first feedback-voltage and the second feedback-voltage,
   wherein a gate-voltage is produced from the bias-voltage, and
   wherein the gate-voltage is injected into the gate of the common-gate transistor.

2. The apparatus of claim 1, wherein the bias-regulator circuit includes a difference amplifier that compares the first feedback-voltage against a reference voltage to produce and regulate the bias-voltage, the difference amplifier being biased by the second feedback-voltage.

3. The apparatus of claim 2, wherein the difference amplifier includes an operational amplifier.

4. The apparatus of claim 2, wherein the gate of the common-source transistor is set to a drive signal.

5. The apparatus of claim 1, wherein the feedback-circuit includes a voltage-doubler circuit in signal communication with the source of the common-gate transistor and the drain of the common-source transistor,
   wherein the voltage-doubler circuit is configured to receive the drain-voltage from the drain of the common-source transistor and produce the second feedback-voltage, and
   wherein the second feedback-voltage is equal to approximately twice the drain-voltage.

6. The apparatus of claim 5, wherein the voltage-doubler circuit includes a charge pump doubling circuit.

7. The apparatus of claim 1, wherein the common-gate transistor is a junction field-effect transistor.

8. The apparatus of claim 7, wherein the common-source transistor is a metal-oxide-semiconductor field-effect transistor.

9. The apparatus of claim 1, further including a driver circuit in signal communication with the bias-regulator circuit and the gate of the common-gate transistor, wherein the gate-voltage is produced from the bias-voltage by the driver circuit.

10. The apparatus of claim 9,
    wherein the driver circuit includes a voltage-divider circuit, and
    wherein the voltage-divider circuit is configured to receive the bias-voltage and produce the gate-voltage.

11. The apparatus of claim 10, wherein the voltage-divider circuit includes a low-pass filter.

12. The apparatus of claim 11, wherein the gate-voltage is the bias-voltage.

13. A method for regulating a bias-voltage of a switching power supply utilizing an apparatus having a cascode amplifier, feedback-circuit, and bias-regulator circuit, the method comprising:
    receiving a drain-voltage from a drain of a common-source transistor of the cascode amplifier;
    producing, by the feedback-circuit, a first feedback-voltage and a second feedback-voltage using the drain-voltage, the first feedback-voltage having a first voltage level and the second feedback-voltage having a second voltage level;
    producing the bias-voltage from the drain-voltage with the bias-regulator circuit using the first feedback-voltage and the second feedback-voltage; and
    injecting a gate-voltage at a gate of a common-gate transistor,
    wherein the gate-voltage is related to the bias-voltage, and
    wherein producing the bias-voltage includes regulating the bias-voltage.

14. The method of claim 13, wherein producing the bias-voltage from the first feedback-voltage and the second feedback-voltage includes comparing the first feedback-voltage against a reference voltage with a difference amplifier to produce and regulate the bias-voltage.

15. The method of claim 14, further including setting a gate of the common-source transistor to a drive signal.

16. The method of claim 13,
    wherein the second feedback-voltage is produced by a voltage-doubler circuit within the feedback-circuit, and
    wherein the second feedback-voltage is equal to approximately twice the drain-voltage.

17. The method of claim 16,
    wherein producing the bias-voltage from the first feedback-voltage includes comparing the first feedback-voltage against a reference voltage with a difference amplifier to produce and regulate the bias-voltage, the difference amplifier being biased by the second feedback-voltage, and
    further including setting a gate of the common-source transistor to a drive signal.

18. The method of claim 13,
wherein injecting the gate-voltage at the gate of the common-gate transistor includes voltage dividing the bias-voltage to produce the gate-voltage with a voltage-divider circuit.

19. The method of claim 18, further including low-pass filtering the bias-voltage to produce the gate-voltage with the voltage-divider circuit.

20. The method of claim 13, wherein the gate-voltage is the bias-voltage.

* * * * *